Patented May 3, 1927.

1,627,057

UNITED STATES PATENT OFFICE.

THOMAS W. MORRIS, OF LIVERPOOL, ENGLAND.

PRESERVATION OF BACON OR HAM.

No Drawing. Application filed May 18, 1926, Serial No. 110,018, and in Great Britain February 12, 1926.

This invention is concerned with improvements in the preservation of bacon or ham, and is especially useful for retarding the decomposition of mild bacon which contains an amount of water sufficient to render it readily subject to decomposition. It is the object of the invention to provide a single process which can be applied without using antiseptics such as borax.

According to the invention I subject the whole of the surface of the bacon or ham to a sterilizing temperature and impregnate it with gylcerin. I prefer to treat the material with a body of liquid preferably by immersion in a bath of hot glycerin. No other ingredients are necessary, and antiseptics can be omitted completely.

It has previously been proposed to coat the surface of meat with glycerin, but not to sterilize by heat. It has also been proposed to use an antiseptic mixture containing, inter alia, glycerin and tannin. But in my process sterilization is effected and that without the aid of antiseptics. The bath of hot glycerin is the preferred embodiment of my invention since this simultaneously sterilizes the surface and applies a uniform coating of glycerin which has valuable results for the purpose desired.

*Example.*

Drain mild bacon well and if it is wet after draining, wipe the moisture from its surface with a cloth.

Heat the glycerin in a tank to a temperature of about 212° to 220° F. To avoid possible decomposition of the glycerin through overheating, it is advisable to keep the air above the gylcerin somewhat moist e. g. by blowing a little steam therein.

Dip the bacon therein and remove it as rapidly as possible. Then drain and cool it, when it is then ready for keeping, packing or dispatch. This method of immersion in a bath of hot glycerin is the best method of achieving the result according to the invention.

To prepare the processed bacon for consumption, wash it in warm water and then hang it up.

When applied in the manner described, the hot gylcerin tends to destroy bacteria formed on the bacon up to the time of dipping. Further, the glycerin apparently sinks into the surface, blocks the pores and hardens the surface of the bacon thus forming a triple protection against flies, bacteria and air.

By this process mild bacon can be kept in good condition for a longer period and also sent a longer distance without risk of deterioration than if not processed.

The process is highly effective in arresting the growth of both mould and bacteria. It does not give the bacon an unpleasant flavour, odour or appearance. In view of the objections to the use of borax the present process of heat treatment is of special value.

I declare that what I claim is:—

1. The process of treating bacon or ham which consists in heating a bath of glycerin to a sterilizing temperature, immersing the bacon or ham momentarily therein, and quickly removing it therefrom.

2. The method of treating wet bacon or ham which consists in heating a bath of glycerin to above 212 degrees Fahrenheit, immersing the wet bacon or ham momentarily therein, and quickly removing it therefrom.

3. Bacon or ham having a heat-sterilizing surface with glycerin therein.

In witness whereof I have hereunto signed my name this 6 day of May, 1926.

THOMAS W. MORRIS.